United States Patent [19]

Armstrong

[11] 4,013,131
[45] Mar. 22, 1977

[54] WALKING TYPE AGRICULTURAL IMPLEMENT WITH HARNESS

[76] Inventor: Bernard C. Armstrong, 535 Westmoreland, Jackson, Tenn. 38301

[22] Filed: Sept. 9, 1975

[21] Appl. No.: 611,671

[52] U.S. Cl. .................................. 172/370; 280/1.5
[51] Int. Cl.² .......................................... A01B 3/02
[58] Field of Search ............ 172/41, 330, 334, 353, 172/370, 431, 434; 280/1.5, 290; 182/3, 6, 7, 9; 115/6.1, 22.1, 22.2, 26.1; 119/96; 297/385, 389

[56] References Cited

UNITED STATES PATENTS

| | | | |
|---|---|---|---|
| 535,650 | 3/1895 | Wilson | 172/353 |
| 636,108 | 10/1899 | Blackman | 280/290 |
| 1,086,642 | 2/1914 | Bouyer | 172/370 |
| 1,234,871 | 7/1917 | Caw | 280/1.5 |
| 1,580,391 | 4/1926 | U'Ren | 172/370 X |
| 1,589,196 | 6/1926 | McCarty | 280/1.5 |
| 2,366,231 | 1/1945 | Armstrong | 280/1.5 |

FOREIGN PATENTS OR APPLICATIONS

| | | | |
|---|---|---|---|
| 272,539 | 4/1914 | Germany | 172/353 |
| 412,000 | 9/1945 | Italy | 172/353 |

*Primary Examiner*—Richard T. Stouffer

[57] ABSTRACT

An agricultural implement including an elongated body member with a cultivating member extending downwardly therefrom at the rear thereof, a body support assembly attached to the front end thereof, a handle disposed therebetween and extending upwardly therefrom and, a harness attached to the body support assembly and the handle, the harness including a loop for hitching an operator therein.

8 Claims, 3 Drawing Figures

WALKING TYPE AGRICULTURAL IMPLEMENT WITH HARNESS

BACKGROUND OF THE INVENTION

This invention relates to agricultural implements of the walking type and more particularly relates to an agricultural implement including a harness device adapted to be applied whereby the weight and force of the body of the operator is utilized to pull the implement.

In recent years there has been considerable activity in the development of agricultural implements and garden tools which may be manually operated. In these devices provisions are made whereby the operator may push or pull the implements and tools utilizing the weight and force of the body of the operator as the pushing or pulling means. It has been found, in devices of the pull type, force is transmitted from the hips and backs whereby less fatigue of the operator is realized because of the distribution of the pulling force from said hips and backs. Pull devices also enable the operator to walk on unplowed or untilled soil thereby preventing the packing of freshly tilled soil experienced in operating implements of the push-type. However, in most of these devices problems have arisen in that after a short period of time, fatigue and chafing of the operator set in, mostly due to improper support of the body while pulling the implement.

SUMMARY OF THE INVENTION

In the present invention, it is recognized that it is desirable to provide an agricultural implement which is manually operated whereby the operator may pull the tool while walking backwards in front of the implement. It is further recognized that it is desirable to provide a manually operated agricultural implement which cuts down on fatigue and chafing of the operator.

The present invention advantageously provides a straightforward arrangement for an agricultural implement which may be manually operated. The present invention further provides an agricultural implement which is manually operated whereby the operator may pull the implement while walking backward. The present invention even further provides an agricultural implement of the manually operated type which provides for support for the operator when pulling the implement.

In the present invention, it has been found that by providing an elongated body member with a downwardly extending cultivating member at the back end thereof and a body support assembly at the front thereof with a support harness attached to the seat and a handle which is disposed between the body support assembly and the cultivating member, the operator has his hands free to operate the handle member and by bending forward as the operator walks backwardly, the operator can apply pressure downwardly thereby forcing the cultivating member into the soil. Furthermore, by positioning the body support assembly to align with the hips and lower part of the back in combination with the harness which is attached to the body support assembly, the back and arms of the operator, forming an arch, are braced by the wide distribution of the reactionary force of the harness belts, minimizing fatigue and chafing. When pressure is released on the body support assembly the implement hangs suspended from the shoulders and back, allowing a free swinging motion of the implement to release trash accumulated by the tines, and occasional cultivation between the plants in the row. The harness, having no rigid members in contact with the shoulders, allows freedom for the operator to pull an occasional weed or other task requiring stooping while bracing himself with one hand on the handle.

Various other features of the present invention will become obvious to those skilled in the art upon reading the disclosure set forth hereinafter.

More particularly, the present invention provides an agricultural implement of the walking type comprising: an elongated body member having a downwardly extending cultivating member attached thereto at one end thereof with an upwardly extending body support assembly attached at the opposed end thereof with handle means attached therebetween; and, harness means attached at one end to the body support assembly and the other end to the handle means, the harness means including a loop therein, the loop being provided with means for hitching an operator therein.

It is to be understood that the description of the examples of the present invention given hereinafter are not by way of limitation. Various modifications within the scope of the present invention will occur to those skilled in the art upon reading the disclosure set forth hereinafter.

Referring to the drawing.

Figure 1:
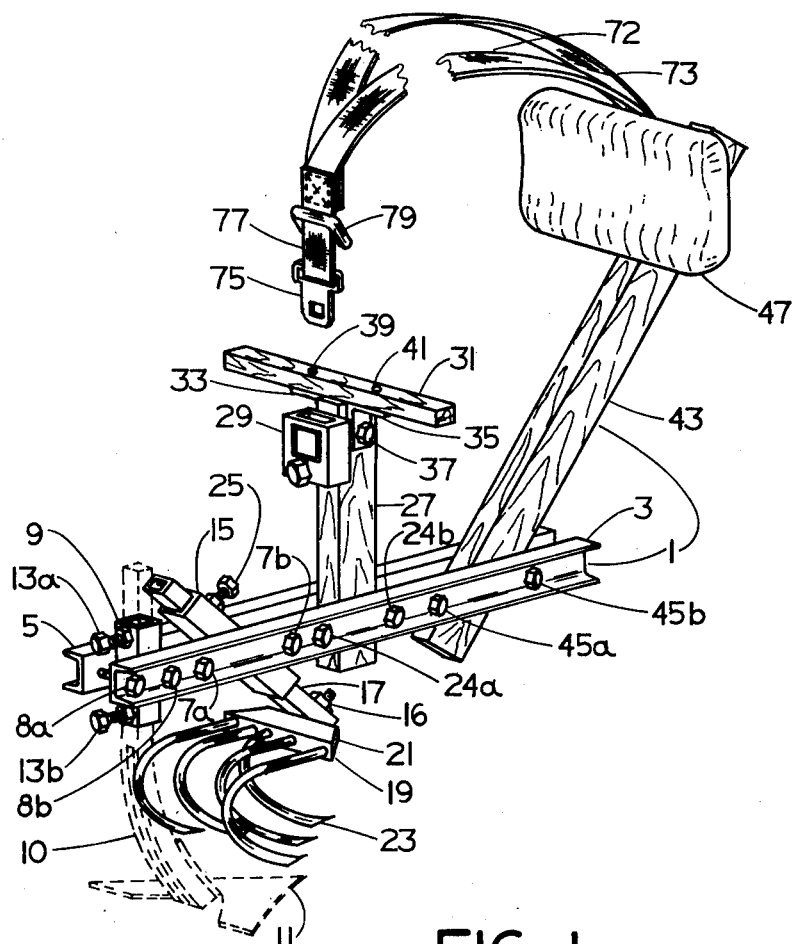
FIG. 1 is a perspective view, partially cut away, of one agricultural implement of the present invention showing two cultivating members, one outlined with phantom lines.
Figure 2:
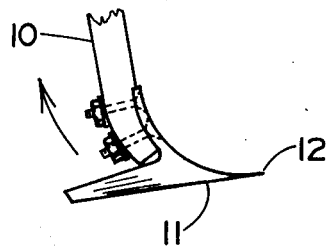
FIG. 2 is an enlarged cross-sectional view illustrating the cultivating member of FIG. 1 shown in phantom lines; and, FIG. 3 is an enlarged cross-sectional view illustrating the body support assembly and belt attaching means of FIG. 1.

FIG. 1 shows one preferred embodiment of the present invention comprises an elongated body support member 1 which includes two spaced channel members 3 and 5, respectively, channel members 3 and 5 being attached by a plurality of bolt members, to be discussed hereinafter, which extend through aligned apertures in the channel members 3 and 5, spacing between the members 3 and 5 being predetermined as discussed hereinafter. Channel members 3 and 5 receive therebetween at the back end thereof a rectangularly-shaped tubular support member 9 which extends downwardly therefrom and substantially perpendicular thereto, support member 9 being adjustably held in position by bolt members 8a and 8b which are on opposed sides of member 9 extending through and received by aligned apertures in channels 3 and 5. Support member 9 receives a plow 11 or other cultivating devices, as shown in phantom lines, therein, the plow 11 including an upwardly extending rectangular shaped tubular member 10 which has an outer periphery and configuration substantially the same as the inner periphery and configuration of the tube 9, tubular member 10 being adjustably received therein. The tube support 9 includes a pair of set screws 13a and 13b which extend through apertures therein, the distance between the plow 11 and the elongated member 1 being determined by adjusting tubular member 10 to a desired position within member 9 then tightening members 13a and 13b thereby setting the desired position of the plow 11. The tube 9 is substantially perpendicular to the elongated member 1 and the tubular member 10 turns in an angular direction toward the front end of the member 1 thereby defining the plow blade 11 with a forwardly directed cultivating point 12.

The elongated member 1 further includes a rectangularly shaped tubular support member 15 which extends angularly downwardly in a forward direction in relation to the elongated member 1. Tubular support member 15 receives in adjusting relation tubular member 17 therein, the tubular member 17 having an outer periphery of approximately the same size and configuration as the inner periphery of the tubular support member 15. Attached to the lower or downwardly extending portion of the tubular member 17 by bolt 16 is a ground working assembly 19 which includes a rearwardly extending flat plate member 21. Attached to the rear extremity of the plate member 21 is a plurality of ground working members 23 of any desired type and character generally employed in connection with agricultural implements for garden use, the ground working members 23 being illustrated as a plurality of elongated members of L-shaped configuration with the base portion of the L-extending downwardly into the ground during operations and terminating in a point whereby the ground is worked upon pulling the members 23 along or just beneath the surface thereof.

The tubular member 17 includes at least one adjusting set screw 25 therein which extends through an opening in the tubular member 15 for holding the tubular member 17 in a desired position, the position of the member 17 being determined by the desired distance between the elongated member 1 and the ground working members 23.

The tubular member 15 is of substantially the same size and configuration as the tubular member 9, tubular member 15 being held in place by tightening of the bolts 7a and 7b which are spaced at preselected positions along the channels 3 and 5 on opposite sides of tubular support 15.

Disposed approximately midway of the elongated member 1 is an upwardly extending adjustable rectangularly shaped wood support member 27, support member 27 being disposed between and substantially perpendicular to the channels 3 and 5, the size and configuration of the rectangular support member 27 being approximately the same thickness or width as the rectangularly shaped members 9 and 15. It is realized that even though the member 27 is shown as being wood, member 27 may be a metal tube or any other material of construction suitable for mounting a handle member thereto. The upwardly extending rectangular member 27 being the support member for the handle means is held in fixed position by the bolts 24a and 24b, respectively, which are disposed on each side thereof, bolts 24a and 24b being tightened sufficiently to prevent slippage of the member 27 once a desired position has been established. Furthermore, loosening and tightening of bolts 24a and 24b enables adjustment of the height of a handle member 31, hereinafter described.

The upwardly extending member 27 includes a harness latch receiving device 29 on the rear edge thereof, and the transversely extending handle member 31 on the top thereof, the handle member 31 being attached thereto by a pair of L-shaped brackets 33 and 35. Opposed legs of each bracket 33 and 35 are disposed on opposed sides of the tubular member 27, brackets 33 and 35 having apertures therein in alignment with mating openings (not shown) in support member 27 and attached thereto by bolt member 37. Brackets 33 and 35 are further provided with apertures on the remaining legs with bolt members 39 and 41, respectively, being received therethrough, bolt members 39 and 41 extending through aligned apertures in the handle member 31.

Figure 3:
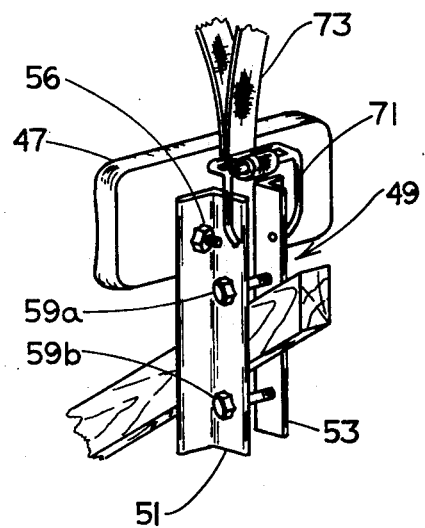

Disposed at the front end of the elongated body member 1 is an upwardly extending rectangular shaped member 43 which extends forward in an angularly direction, the rectangular shaped member 43 being shown as wood but may be metal tubing or other materials of construction upon which a seat or hips support member may be placed. The thickness of the wood member 43 is approximately the same thickness as the wood member 27, as noted previously, and is held in position by bolt members 45a and 45b which extend through mating apertures in the spaced channel members 3 and 5, the spacing of these aligned apertures being preselected on opposite sides of the member 43. At the upper extremity of the member 43 is a body support mounting assembly 49 which includes a pair of L-shaped members 51 and 53 (FIG. 3), respectively, with a pair of aligned apertures (not shown) in first opposed legs, the apertures receiving bolt members 59a and 59b therethrough. Spacing between aligned apertures in the members 51 and 53 is sufficient to allow various positions of the seat mounting means. Loosening and tightening of the bolts 45a and 45b enables adjustment of the elongated rectangular member 43.

A padded vertically extending body support member 47 is attached to the seat mounting assembly 49 by two bolt members 56, only one being shown, which extend through apertures (not shown) in the padded support member 47 and aligned apertures in L-shaped members 51 and 53. The support member 47 generally includes a wood backing with padding attached thereto and upholstery material covering the padding and the wooded portion. Generally, any type of rectangular shaped padded seat may be utilized in my invention, the only requirement being that it is of sufficient size to fit across the hip or lower part of the back whereby comfort as well as support for this portion of the body may be obtained.

The mounting assembly 49 is also provided with a pair of apertures therein for receiving a belt adjusting assembly 71 for belt 73. Belt adjusting assembly 71 is generally fabricated from two steel rods bent into C-shaped configuration, one of the rods being welded to opposite sides of the base of the other C-shaped rod, the C-shaped members being perpendicular. The ends of the assembly 71 are disposed within the aforementioned aperture of L-shaped members 51 and 53 and held securely thereto by any well known means, such as bradding, or the like, the adjusting assembly being pivotally secured therein.

The belt 73 extends around the base portions of the perpendicular C-shaped rods of belt adjusting assembly 71 forming a loop or harness as designated by the numeral 72. Belt 73 is attached to a belt winding assembly which includes a single belt member 77, a latch 75 and a winding device 79 therein for adjusting and taking up the slack between the latch 75 and the loop 73 upon insertion of the latch 75 into the latch receiving member 29. The winding device 79 may be any of those known in the art, such as those described in U.S. Pat. Nos. 3,294,340 and 3,304,024. The latch 75 and latch receiving member 29 may be any well known latch and receiving means known in the art. It is also realized that the belt 73 may comprise two belts with both belts being threaded through the belt adjusting assembly 71 with both ends of each belt being attached to the single belt member 77.

In putting the implement into use, the operator positions the elongated body member 1 between his legs with the vertically extending body support member 47 resting on the backside of the operator's hips or lower back, placing the loop 72 over the head and beside the neck. The latch 75 is then inserted into the latch receiving member 29.

The position of the support member 47 for the operator is generally adjusted prior to putting the operator into the implement by loosening and then tightening bolt members 45a and 45b and 59a and 59b upon determining a comfortable position. The position of the handle member 31 is also usually adjusted prior to putting the operator into the implement by loosening and tightening of the bolt members 24a and 24b upon determining a desired position.

The implement may be used in many various ways by inserting the appropriate soil working device into either the transversely extending tubular member 9 or the angularly extending tubular member 15.

It is realized that various changes may be made to the specific embodiment that I have shown and described without departing from the scope and spirit of the present invention.

What is claimed is:

1. An agricultural implement of the walking type comprising:
    an elongated body member, said member receiving a downwardly extending cultivating member attached thereto at one end thereof said cultivating member including a support means extending downwardly from said body member and supporting at least one blade element adjacent the bottom end thereof, wherein said blade element includes a surface tapered to a point forming a cutting edge for loosening or breaking up soil, an upwardly extending body support assembly also received by said member and attached thereto at the opposed end thereof, and a handle means attached to and received by said member, said handle means being positioned between said cultivating member and said body support member intermediate the length of said member, harness means attached at one end thereof to said body support member and at the other end thereof to said handle means, said harness means including a belt, said belt being provided with means for hitching an operator therein.

2. The agricultural implement of claim 1, said elongated body member being a pair of opposed spaced channel members, the spacing being preselected to receive said cultivating member, said handle means, and said body support assembly therebetween.

3. The agricultural implement of claim 2 wherein said cultivating member includes a rectangular shaped tubular member for receiving a cultivating tool therein, said rectangular member extending between said channel members, said channel member including a pair of aligned apertures therein at preselected positions on opposed sides of said tubular member with bolt members extending therethrough.

4. The agricultural implement of claim 2 wherein said handle means includes a rectangular shaped handle support member with a transversely extending handle member on the top thereof, said handle support member extending between said channel members with each channel member having a pair of aligned spaced apertures therein on each side of said handle support member with bolt members extending therethrough whereby loosening and tightening of said bolt members enables adjustment of the height of said handle member.

5. The agricultural implement of claim 2, said body support assembly including an elongated rectangular body support member extending between said spaced channel members, said channel member including a pair of spaced aligned apertures therein, each pair of aligned apertures being on opposite sides of said elongated rectangular member with bolt means extending therethrough whereby loosening and tightening of said bolt member enables adjustment of said elongated rectangular member.

6. The agricultural implement of claim 5, said body support assembly including a body mounting assembly attached to the end of said body support member opposed to said spaced channel members, said body support mounting assembly having a body support attached thereto.

7. The agricultural implement of claim 6, said body support assembly having a belt adjusting assembly attached thereto, said belt adjusting assembly receiving said belt of said harness means therethrough.

8. The agricultural implement of claim 7, said harness means being attached to said belt adjusting member at said one end thereof, said harness means including a latch and belt winding device at said opposed end.

* * * * *